US012317045B2

(12) United States Patent
Monti

(10) Patent No.: US 12,317,045 B2
(45) Date of Patent: May 27, 2025

(54) BALANCED ARMATURE RECEIVER HAVING IMPROVED FREQUENCY RESPONSE

(71) Applicant: Knowles Electronics, LLC, Itasca, IL (US)

(72) Inventor: Christopher Monti, Elgin, IL (US)

(73) Assignee: Knowles Electronics, LLC, Itasca, IL (US)

( * ) Notice: Subject to any disclaimer, the term of this patent is extended or adjusted under 35 U.S.C. 154(b) by 393 days.

(21) Appl. No.: 18/086,657

(22) Filed: Dec. 22, 2022

(65) Prior Publication Data

US 2023/0217175 A1 Jul. 6, 2023

Related U.S. Application Data

(60) Provisional application No. 63/295,321, filed on Dec. 30, 2021.

(51) Int. Cl.
*H04R 7/20* (2006.01)
*H04R 9/04* (2006.01)

(52) U.S. Cl.
CPC ............... *H04R 7/20* (2013.01); *H04R 9/046* (2013.01); *H04R 2460/11* (2013.01)

(58) Field of Classification Search
CPC ...... H04R 7/20; H04R 9/046; H04R 2460/11; H04R 2207/021; H04R 2307/027; H04R 7/04; H04R 11/02; H04R 25/60
See application file for complete search history.

(56) References Cited

U.S. PATENT DOCUMENTS

| | | | | |
|---|---|---|---|---|
| 3,588,383 A * | 6/1971 | Killion | H04R 11/00 381/386 |
| 6,853,735 B2 * | 2/2005 | Imahori | H04M 1/0202 381/396 |
| 7,103,196 B2 | 9/2006 | Warren et al. | |
| 7,203,334 B2 | 4/2007 | Schafer et al. | |
| 7,302,748 B2 | 12/2007 | Mekell et al. | |
| 7,336,797 B2 | 2/2008 | Thompson et al. | |
| 7,860,264 B2 | 12/2010 | Mekell et al. | |
| 8,526,651 B2 * | 9/2013 | Lafort | H04R 25/60 381/328 |
| 9,137,605 B2 | 9/2015 | Manley et al. | |
| 9,571,941 B2 | 2/2017 | Heidenreich et al. | |
| 11,399,235 B1 | 7/2022 | Miller et al. | |

(Continued)

FOREIGN PATENT DOCUMENTS

| | | |
|---|---|---|
| CN | 204291354 U | 4/2015 |
| CN | 204350282 U | 5/2015 |

(Continued)

*Primary Examiner* — Angelica M McKinney
(74) *Attorney, Agent, or Firm* — Hickman Becker Bingham Ledesma LLP; Matthew C. Loppnow

(57) ABSTRACT

A diaphragm for a balanced armature receiver and combinations thereof. The diaphragm includes a paddle having an area of concentrated mass located at or near a central portion of the paddle, the area of concentrated mass having an area density greater than an area density of other portions of the paddle, wherein the area of concentrated mass shifts a bending-mode frequency of the paddle to a lower frequency compared to a bending-mode frequency of the paddle in the absence of the area of concentrated mass.

19 Claims, 5 Drawing Sheets

(56) References Cited

U.S. PATENT DOCUMENTS

| | | | | |
|---|---|---|---|---|
| 11,564,039 | B2 * | 1/2023 | Miller | H04R 7/20 |
| 2013/0284537 | A1 | 10/2013 | Lopresti et al. | |
| 2015/0373456 | A1 | 12/2015 | Dayton et al. | |
| 2019/0342666 | A1 | 11/2019 | Dayton et al. | |
| 2019/0387321 | A1 | 12/2019 | Dayton et al. | |
| 2022/0232323 | A1 | 7/2022 | Miller et al. | |

FOREIGN PATENT DOCUMENTS

| | | | | |
|---|---|---|---|---|
| CN | 204350283 U | | 5/2015 | |
| CN | 204350285 U | | 5/2015 | |
| CN | 204350286 U | | 5/2015 | |
| WO | WO-2018148485 A1 | * | 8/2018 | H04R 11/02 |

* cited by examiner

BALANCED ARMATURE RECEIVER HAVING IMPROVED FREQUENCY RESPONSE

FIELD OF THE DISCLOSURE

The present disclosure relates generally to balanced armature (BA) receivers and more particularly to balanced armature receivers having improved frequency response, diaphragms and components for such balanced armature receivers.

BACKGROUND

Balanced armature receivers (also referred to herein as "receivers" and "BAs") capable of producing an acoustic output signal in response to an electrical audio signal are commonly used in hearing aids, wired and wireless earphones, and True Wireless Stereo (TWS) devices, among other hearing devices. BA receivers generally comprise a housing in the form of a cup and cover enclosing a diaphragm that separates an interior of the housing into a back volume and a front volume. An electromagnetic motor includes an electrical coil disposed about an armature (also referred to herein as a "reed") having a free end portion movably disposed between permanent magnets retained by a yoke. A drive rod or other link mechanically connects the reed to a movable part of the diaphragm known as a paddle. The reed vibrates between the magnets when an electrical signal (representing sound) is applied to the coil, otherwise the reed is balanced between the magnets. The moving diaphragm expels sound out of a sound port of the housing via the front volume.

A plot of the BA receiver output sound pressure level (SPL) typically in decibels (dB) versus frequency in hertz (Hz) is referred to herein as the "frequency response". The acoustic output of the receiver is generally not uniform across all audible frequencies and includes multiple amplitude peaks attributable to mechanical and acoustic resonances. Some of the frequency response peak are predominately attributable to the user's ear canal or to portions of the hearing device coupling the receiver to the ear canal. Another peak is predominately attributable to the diaphragm and more particularly to a bending mode of the paddle. This bending-mode peak typically has a frequency higher than a peak attributable to the user's ear.

An industry-standard ear-simulator is often used for modeling receivers worn by a user. One such simulator is specified by the International Electrotechnical Commission (IEC) 60318-4 standard and is known as a high-resolution 711 coupler. Other simulators can also be used to model receiver performance. Receiver performance is typically measured with the receiver coupled to a coupler, but the frequency response peaks may shift and other peaks may arise when the receiver is actually integrated with a hearing device. Such changes are generally attributable to the acoustic output path or acoustic impedances resulting from the unique structure of the hearing device, among other factors.

In some receivers (e.g., in tweeters) higher SPL peaks may exist at frequencies above the audible range of many users. Such peaks can be attributable to a bending-mode of the paddle, among other causes. For example, some people cannot hear frequencies higher than 18 kHz or less. A diaphragm resonator can shift resonance of these higher frequency peaks to a limited extent, but a resonator alone may be unable to shift the resonance to frequencies perceptible by some people. Thus, there is a desire to provide receivers having improved frequency performance.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described or be performed concurrently unless specified otherwise, and that the terms and expressions used herein have the meaning understood by those of ordinary skill in the art except where different meanings are attributed to them herein.

DETAILED DESCRIPTION

The disclosure relates generally to balanced armature receivers and more particularly to balanced armature receivers having improved frequency response, as well as balanced armature receiver diaphragms and components for such receivers.

Figure 1:
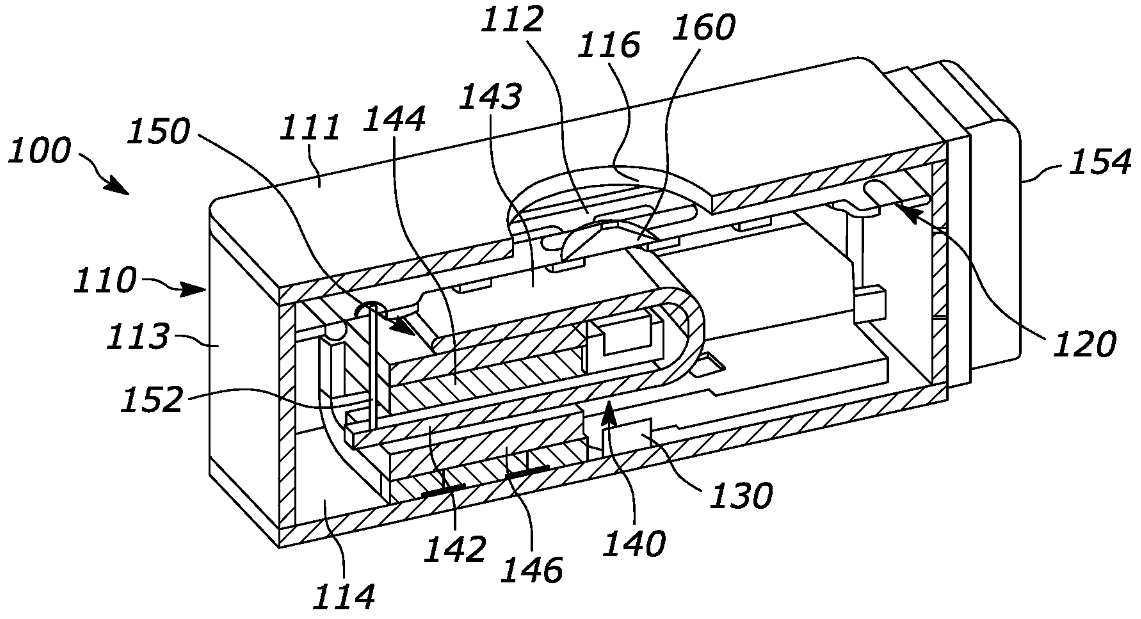
FIG. 1 is a sectional view of a balanced armature receiver having a diaphragm with an area of concentrated mass.

FIG. 1 is a representative BA receiver 100 comprising a diaphragm having an improved frequency response as described herein. The receiver comprises a housing 110, and a diaphragm 120 disposed within and separating an interior of the housing into a front volume 112 and a back volume 114. The front volume is acoustically coupled to an exterior of the housing via a sound port located on a wall portion defining the front volume. In FIG. 1, sound port 116 is located on a housing wall portion 111 parallel to the diaphragm. In other receiver implementations, the sound port can be located on an end wall 113 of the housing. Some receivers also includes a nozzle (not shown in the drawings) disposed over the sound port and coupled to a wall portion of the housing.

The diaphragm generally comprises a paddle movable relative to a frame disposed about a periphery of the paddle. A gap separates the paddle from the frame and a flexible or elastic film covers the gap and permits the paddle to move relative to the frame when driven by a motor of the receiver.

The film can cover the entire paddle and frame or only regions of the paddle and frame adjacent to the gap. The film can also cover any mass-reducing apertures in the paddle in embodiments where such apertures are present. In some receiver implementations, the diaphragm includes a barometric relief vent through the paddle, film or frame to equalize pressure in the back volume. In these implementations, the back volume vents to the exterior of the housing via the front volume. Alternatively, the barometric relief vent can be located in a wall portion of the housing defining the back volume wherein the back volume vents directly to an exterior of the housing instead of to the exterior of the housing via the front volume.

Generally, the receiver includes a motor disposed in the housing for actuating the diaphragm. In FIG. 1, a motor disposed in the back volume comprises a coil 130 supported by a bobbin located about a portion of an armature 140. A free-end portion 142 of the armature is movably located between permanent magnets 144 and 146, which are retained in space apart relation by a yoke 150. The armature includes another portion 143 connected to the yoke. The free-end portion of the armature is coupled to the paddle by a drive rod or other link 152. The armature in FIG. 1 is a U-reed. The receiver also includes a terminal with electrical contacts coupled to the coil. Other receivers can have a variety of other forms. For example, the armature can be an E-reed or T-reed among other reed configurations, the coil need not be supported by a bobbin, the motor can be located in the front volume instead of the back volume, and the terminal can be located elsewhere on the housing, among other variations.

Figure 2:
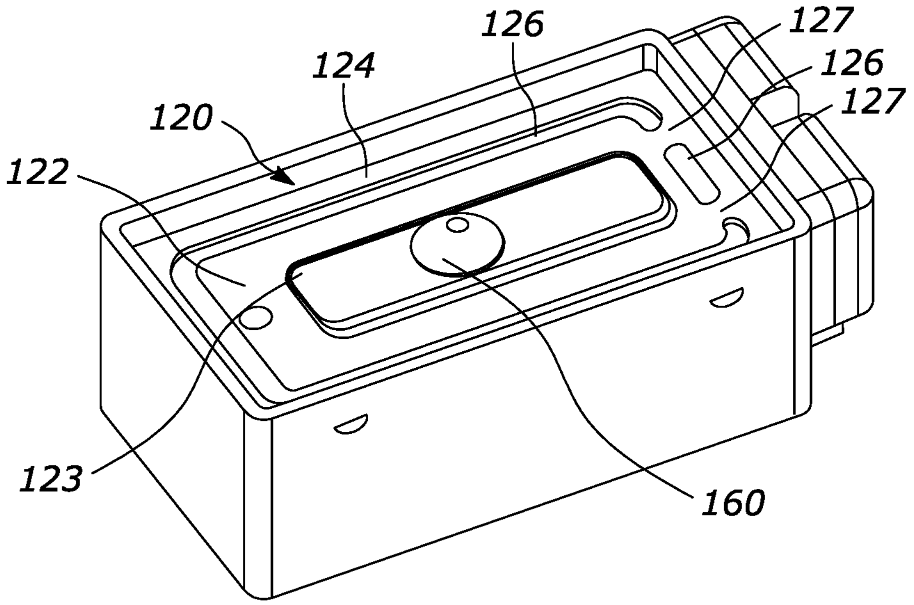
FIG. 2 is a view of a balanced armature receiver with a cover removed exposing a diaphragm having an area of concentrated mass exposed.

In FIG. 2, the receiver comprises a representative diaphragm 120 comprising a substantially planar paddle 122 located within a frame 124 separated from a peripheral portion of the paddle by a gap 126. In some diaphragms, one or more hinges couple the paddle to the frame. In FIG. 2, the hinge is a pair of cantilever hinges 127. In other implementations, the hinge is a torsional hinge. Alternatively, the hinge may comprise of an adhesive, the film, or both. In FIGS. 2-3 and FIGS. 4-6, the paddle includes an optional rib 123 to increase stiffness of the paddle. A paddle including a rib is a planar member for purposes of this disclosure.

In FIGS. 1-3 and 5-6, the paddle, hinge and frame constitute a non-assembled unitary member formed from a sheet material in a stamping and forming operation. The optional rib can also be a non-assembled unitary part of the paddle and formed during these operations. Alternatively, the diaphragm can be an assembly of discrete components, wherein the paddle is fastened to the frame by an adhesive, weld or other fastening mechanism. The diaphragm can also be fabricated by an additive manufacturing (e.g., 3D printing) process, among other known and future manufacturing operations.

Paddles used in BA receivers configured for in-ear and on-ear applications can be formed from a sheet material having a thickness between 0.03 mm and 0.07 mm. As suggested, other portions of the diaphragm can also be fabricated from the same sheet material. The thickness of other receiver paddles may be outside this range. Additionally, the overall thickness of a paddle comprising a sheet material shaped to form a stiffening-rib may be thicker than the thickness of the sheet material. In these and other paddles, the paddle has an effective modulus not less than 30 GPa. The effective modulus for sheet material can be characterized by its flexural modulus (also known as the bending modulus or bending modulus of elasticity), which is a mechanical property that measures a material's stiffness or resistance to bending. The effective modulus is less for sheet materials having an array of apertures, holes, or openings, compared to the same sheet, made of the same alloy or composite, that does not contain apertures, holes, or openings. The flexural modulus is expressed as a ratio of stress to strain and the standard unit of measure is the Pascal (Pa or $N/m^2$).

According to one aspect of the disclosure, a balanced armature receiver diaphragm comprises a paddle having an area of concentrated mass located between opposite ends of the paddle and between opposite sides of the paddle (e.g., in or near a central portion of the paddle). The area of concentrated mass has an area density greater than an area density of other portions of the paddle. The "area density" for the purposes of this disclosure means the mass of a portion of the paddle (e.g., the area of concentrated mass) divided by the area of that portion of the paddle. In one implementation, the area density of the area of concentrated mass is at least twice the area density of other portions of the paddle. In another implementation, the area density of the area of concentrated mass is at least thrice the area density of other portions of the paddle. In another implementation, the area density of the area of concentrated mass is at least six times the area density of other portions of the paddle. In one implementation, the area of concentrated mass comprises at least 10% of a total mass of the paddle. In another implementation, the area of concentrated mass comprises at least 25% of a total mass of the paddle. In another implementation, the area of concentrated mass comprises at least 40% of a total mass of the paddle. In the diaphragm implementations described herein, the paddle can be devoid of a resonator. In other implementations, the diaphragm and particularly the paddle includes a resonator in combination with an area of concentrated mass.

The area density of the area of concentrated mass can be increased by adding material to the area of concentrated mass or by removing material from portions of the paddle other than the area of concentrated mass, or by a combination thereof. Representative examples are described further herein.

Figure 5:
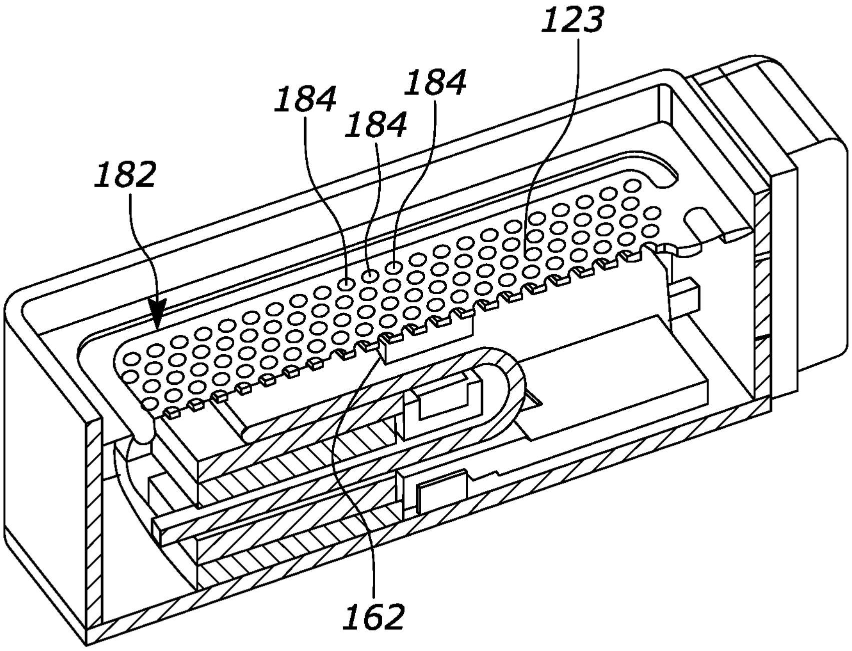
FIG. 5 is a sectional view of a balanced armature receiver with a cover removed exposing a diaphragm having an area of concentrated mass.
Figure 6:
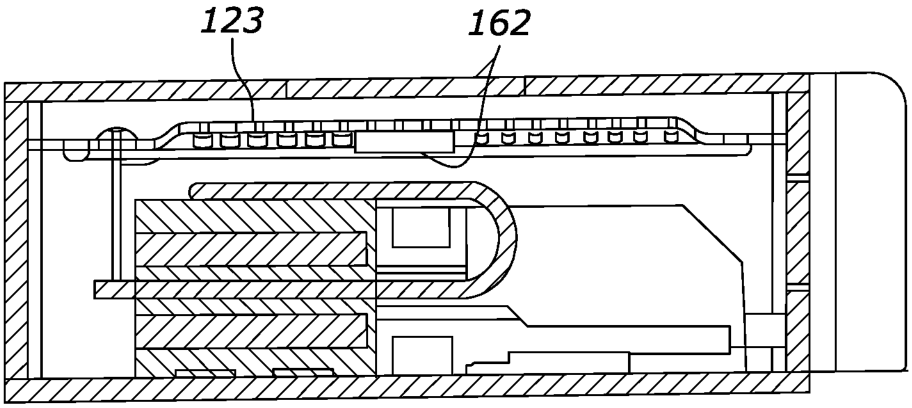
FIG. 6 is a sectional side view of the balanced armature receiver of FIG. 5.

In some implementations, a discrete element contributes to the area of concentrated mass on the paddle. The discrete element can have various different shapes, representative examples of which are described herein. The discrete element can be located on a top or bottom surface of the paddle, or on both the top and bottom surfaces of the paddle. The discrete element can be retained on the paddle by an adhesive, epoxy weld, rivet, crimp or other fastening mechanism. In FIGS. 1-4, a discrete element 160 having a taper is located on a top surface of the paddle at or near a middle or central portion of the paddle, between lateral sides and opposite ends of the paddle. In FIGS. 5-6, a discrete element 162 is located on a bottom surface of the paddle.

Alternatively, the area of concentrated mass can be an area of the paddle having increased thickness compared to other portions of the paddle. The increased thickness can be material located on the top side, bottom side, or on both the top and bottom sides of the paddle. Such a paddle can be an unassembled unitary member made in casting, coining, or additive manufacturing operations, among others. In these implementations, the area density of the area of concentrated mass is attributable, at least in part, to the additional material integrated into the paddle.

In other implementations, the paddle includes a plurality of mass-reducing apertures in portions of the paddle other than the area of concentrated mass. The mass reduction of the paddle can be optimized by selecting the size and shape of the apertures and by appropriately distributing the apertures about the paddle. Such apertures can be formed in stamping, milling, casting or additive manufacturing operations, among others. In these implementations, the area density of the area of concentrated mass is attributable, at least in part, to fewer apertures (if any) per unit area in the area of concentrated mass compared to the apertures per unit area in the other portions of the paddle. In some implementations, there are no apertures in the area of concentrated mass. The mass of the paddle with or without apertures can also be reduced by appropriate selection of the material and dimensions of the paddle.

Figure 3:
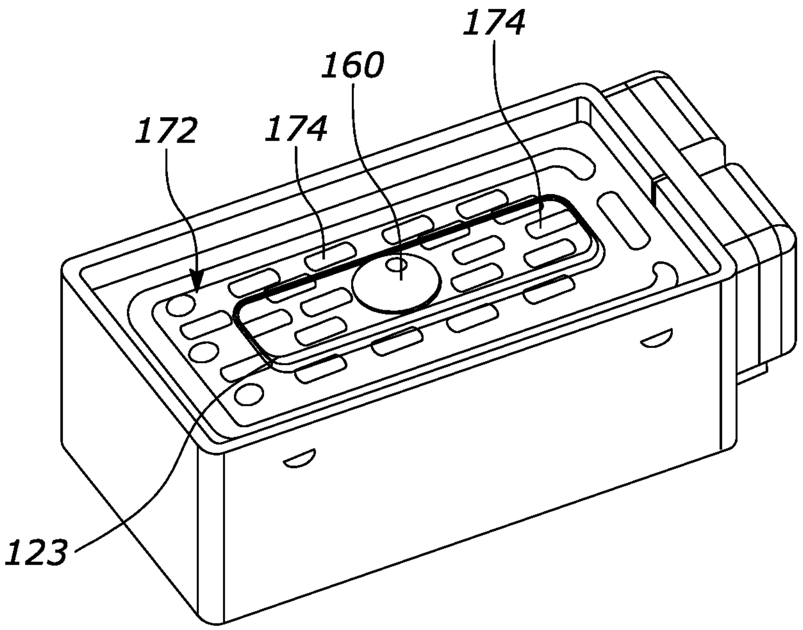
FIG. 3 is another a view of a balanced armature receiver with a cover removed exposing a diaphragm having an area of concentrated mass.
Figure 4:
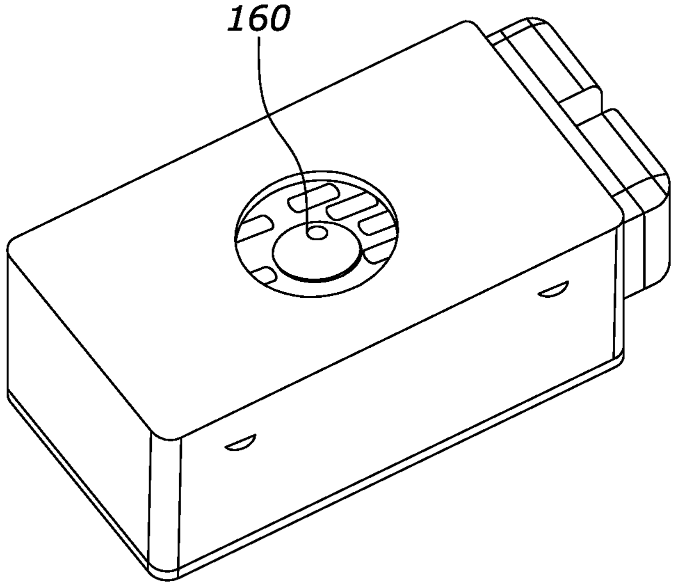
FIG. 4 is a view of the balanced armature receiver of FIG. 3 having a cover with a sound port.

In other implementations, the paddle can include apertures in combination with material added to the area of concentrated mass as described above. In FIG. 3, the paddle 172 comprises a plurality or mass-reducing apertures 174 distributed about the paddle and a tapered button-shaped discrete element 160 located at or near a middle portion of the paddle (e.g., on a top or bottom surface of the paddle between opposite sides and opposite ends of the paddle). In FIGS. 5 and 6, the paddle 182 comprises a plurality of mass-reducing apertures 184 distributed about the paddle and a block-shaped discrete element 162 located on a bottom surface of the paddle near the middle portion of the paddle.

Table I below includes a non-exhaustive list of representative materials from which the paddle, other portions of the diaphragm, and the discrete or integrated element contributing to the area density of the area of concentrated mass can be fabricated. The values in Table I are approximate and may vary by exact material composition and geometry or shape. Also materials having a lower density or smaller thickness may be used where a lesser reduction in the frequency of the frequency response peak is desired.

TABLE I

| Material | Density ($g/cm^3$) | Area Density when the Material is 0.05 mm thick ($mg/cm^2$) | Effective Modulus (GPa) |
|---|---|---|---|
| Magnesium Alloy | 1.8 | 9 | 45 |
| Aluminum Alloy | 2.7 | 13.5 | 69 |
| Aluminum Alloy with 30% Material Removed with Holes | 1.9 | 9.5 | 45 |
| Stainless Steel Alloy | 7.8 | 39 | 200 |
| Carbon Fiber Composite | 1.5 | 7.5 | 116 |
| Tungsten Carbide | 15 | 75 | 600 |

In one implementation, the area of concentrated mass comprises a material having a density greater than 2.7 grams per cubic centimeter ($g/cm^3$). In other implementations, the area of concentrated mass comprises a material having a density of more than 7.0 $g/cm^3$ (e.g., stainless steel) or more than 13.0 $g/cm^3$ (e.g., tungsten carbide). In some implementations, the area of concentrated mass has an area density over 10 $mg/cm^2$. For example, a 0.05 mm thick solid aluminium sheet is about 13.5 $mg/cm^2$. In one implementation, the area of concentrated mass has an area density of more than 50 $mg/cm^2$. In another implementation, the area of concentrated mass has an area density more than 100 $mg/cm^2$. In another implementation, the area of concentrated mass has an area density greater than 200 $mg/cm^2$. For example, a 0.05 mm thick stainless steel sheet fastened to a 0.05 mm thick aluminium sheet has an area density of about 53 $mg/cm^2$, a 0.14 mm thick stainless steel sheet fastened to a 0.05 mm thick aluminium sheet has an area density of about 124 $mg/cm^2$, and a 0.14 mm thick tungsten carbide sheet fastened to a 0.05 mm thick aluminium sheet has an area density of about 224 $mg/cm^2$. The foregoing representative examples are non-exhaustive and non-limiting.

Increasing the overall mass of the paddle increases the total moving mass of the receiver in operation and can lower the frequency of the first peak or other frequency response peaks below the peak predominately attributable to the diaphragm. Increasing the overall mass of the paddle can also decrease the amplitude of the response after the first peak. Therefore, it is generally preferred not to increase the overall mass of the paddle. The overall mass of the paddle can be increased only slightly, maintained at approximately the same value, or even reduced while still having the desired effects on the frequency response peak attributable predominately to the diaphragm by adding mass only to the area of concentrated mass. The mass increase in the area of concentrated mass can be offset by adding mass-reducing apertures to the paddle, by using a lower density material for the paddle, or by using a thinner material, among other means of reducing the overall mass of the paddle. The overall mass of the paddle may even be reduced using one of these or other mass reducing schemes.

Generally, the area density of the area of concentrated mass and the overall mass of the paddle affect the frequency response of the balanced armature receiver. More particularly, the area density of the area of concentrated mass affects the frequency response peak attributable predominately to the diaphragm. Increasing the mass of the area of concentrated mass tends to decrease the frequency of the frequency response peak predominately attributable to the diaphragm. Increasing the mass of the area of concentrated mass on the paddle also tends to increase the amplitude of the peak predominately attributable to the diaphragm. Conversely, decreasing the mass of the area of concentrated mass tends to increase the frequency of the frequency response peak predominately attributable to the diaphragm. Decreasing the mass of the area of concentrated mass on the paddle also tends to decrease the amplitude of the peak predominately attributable to the diaphragm. Representative frequency response plots are described below.

Figure 7:
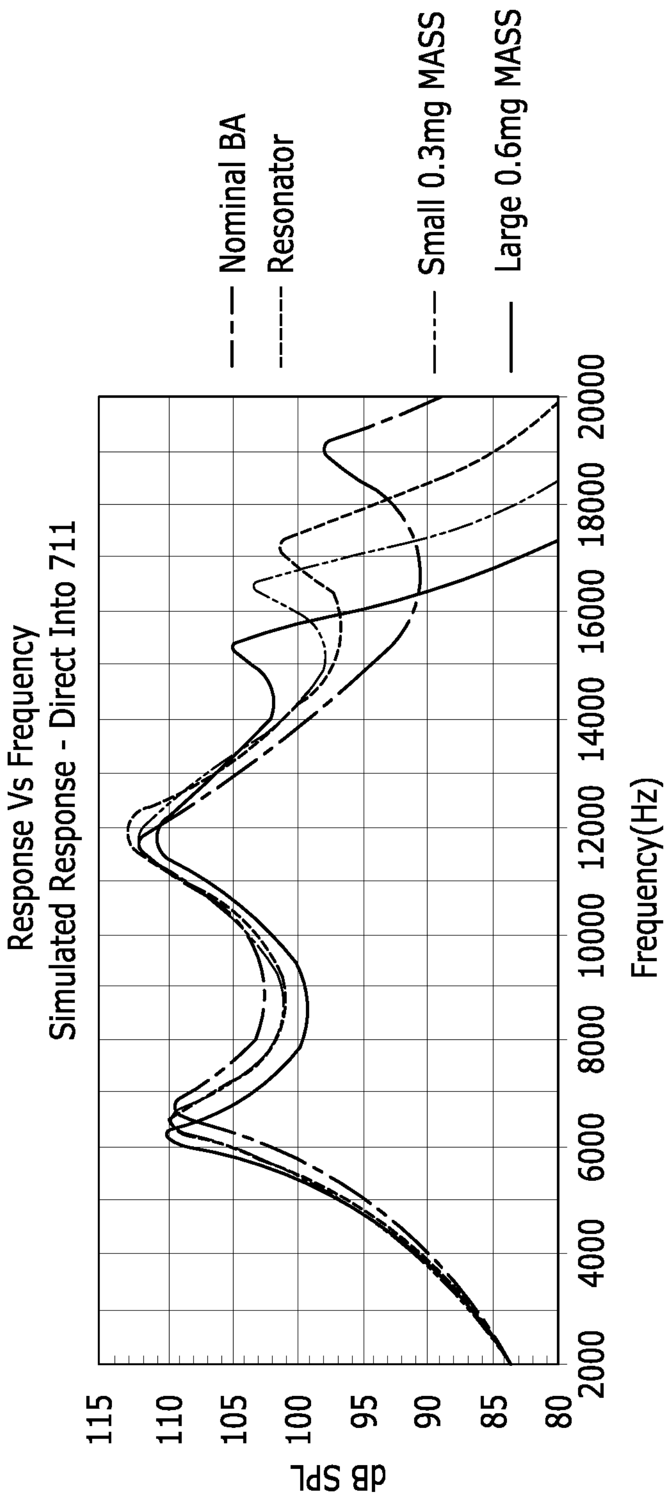
FIG. 7 illustrates frequency response plots for various diaphragm configurations.

FIG. 7 shows the frequency response modeled for various diaphragm configurations implemented in a receiver connected to a 711 ear-simulation coupler. The third peak of each plot in FIG. 7 corresponds to the frequency response peak predominately attributable to the diaphragm. The "Nominal" plot is a baseline plot for a diaphragm without an area of concentrated mass and without a resonator. The third peak of the "Nominal" plot is at 19 kHz. The "Resonator" plot is for a diaphragm comprising a resonator but not an area of concentrated mass. A resonator is an alternative or cumulative means of altering the frequency response of a receiver that, to a first order, involves lowering the stiffness of the diaphragm. The third peak of the "Resonator" plot is at a little more than 17 kHz, almost 2 kHz less than the third peak frequency of the "Nominal" plot. The "Small 0.3 mg Mass" plot is for a paddle having a 0.3 mg mass contributing to the area density of the area of concentrated mass. The third peak of the "Small 0.3 mg Mass" plot is at about 16.5 kHz, almost 1 kHz less than the third peak frequency of the "Resonator" plot and about 2.5 kHz less than the third peak frequency of the "Nominal" plot. The "Small 0.3 mg Mass" represents more than a ten percent (10%) reduction in frequency relative to the "nominal" plot. The "Large 0.6 mg Mass" plot is for a paddle having a 0.6 mg mass contributing to the area density of the area of concentrated mass. The third peak of the "Large 0.6 mg Mass" plot is a little more than 15 kHz, almost 4 kHz less than the third peak frequency of the "Nominal" plot, almost 2 kHz less than the third peak frequency of the "Resonator" plot, and more than 1 kHz less than the third peak frequency of the "Small 0.3 mg Mass" plot. The "Large 0.6 mg Mass" represents more than a fifteen percent (15%) reduction in frequency relative to the "nominal" plot. All other characteristics and features (e.g., size, shape, materials . . . ) of the diaphragms from which the plots in FIG. 7 are modeled are the same. FIG. 7 also shows the increase in amplitude of the third peak of the frequency response relative to the "Nominal" and "Resonator" plots. The third peak of "Large 0.6 mg Mass" plot has a higher amplitude than the Small 0.3 mg Mass" plot.

Figure 8:
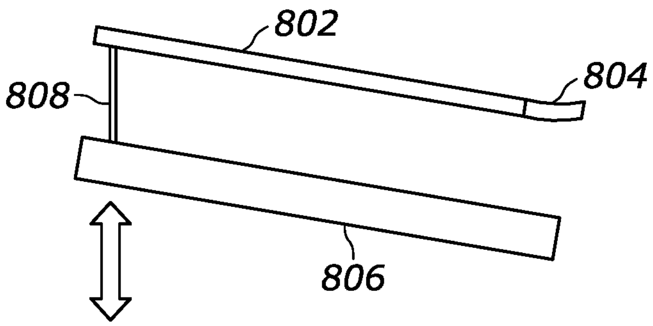
FIG. 8 illustrates a first mode of the paddle, reed and drive rod moving together.
Figure 9:
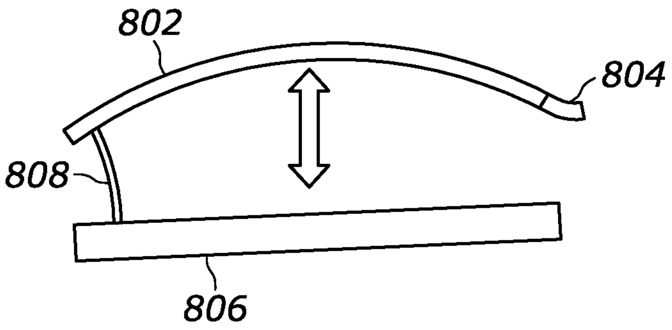
FIG. 9 illustrates a first paddle-bending mode.

In FIG. 8, the paddle 802 pivots about a hinged end 804 when driven by a movable portion of an armature 806 coupled to the paddle by a drive rod or other link 808. The frequency response peak predominately attributable to the diaphragm results from a first bending mode of the paddle 802 shown in FIG. 9. Adding mass to the paddle 802 tends to lower the resonant frequency of the first bending mode (referred to herein as the "bending-mode frequency") of the paddle. By locating the area of concentrated mass at or near the center of the paddle, the total mass addition to the paddle can be relatively small while having a similar effect as adding a larger evenly distributed mass. The area of concentrated mass lowers the resonant frequency of the first bending mode of the paddle. Lowering the resonant frequency of the first bending mode moves the frequency response peak predominately attributable to the diaphragm to a lower frequency and increases the amplitude of the peak, among other beneficial acoustic effects described herein.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. A balanced armature receiver diaphragm comprising:

a paddle comprising a substantially planar member having a material thickness between 0.03 mm and 0.07 mm and an effective modulus not less than 30 Gigapascal, the paddle having an area of concentrated mass located at or near a central portion of the paddle, the area of concentrated mass having an area density greater than an area density of other portions of the paddle, wherein the area of concentrated mass is configured to decrease a bending-mode frequency of the paddle compared to a bending-mode frequency of the paddle in the absence of the area of concentrated mass.

2. The balanced armature receiver diaphragm of claim 1 further comprising a discrete element fastened to the paddle, wherein the discrete element contributes to the area of concentrated mass.

3. The balanced armature receiver diaphragm of claim 2, wherein the area density of the area of concentrated mass is at least twice the area density of the other portions of the paddle.

4. The balanced armature receiver diaphragm of claim 2, wherein the area density of the area of concentrated mass is at least thrice the area density of the other portions of the paddle.

5. The balanced armature receiver diaphragm of claim 2, wherein the area density of the area of concentrated mass is at least six times the area density of the other portions of the paddle.

6. The balanced armature receiver diaphragm of claim 2, wherein the area of concentrated mass has an area density of at least 50 mg/cm$^2$.

7. The balanced armature receiver diaphragm of claim 2, wherein the area of concentrated mass comprises a material having a density greater than 2.7 grams per cubic centimeter.

8. The balanced armature receiver diaphragm of claim 7, wherein the area of concentrated mass comprises a mass of at least 0.3 grams.

9. The balanced armature receiver diaphragm of claim 7, wherein the area of concentrated mass comprises a mass of at least 0.6 grams.

10. The balanced armature receiver diaphragm of claim 1 further comprising a plurality of mass-reducing apertures through the paddle, wherein the area density of the area of concentrated mass is attributable, at least in part, to fewer apertures per unit area in the area of concentrated mass compared to the apertures per unit area in the other portions of the paddle.

11. The balanced armature receiver diaphragm of claim 1, wherein the paddle is devoid of a resonator.

12. The balanced armature receiver diaphragm of claim 1, wherein the area of concentrated mass comprises at least 10% of a total mass of the paddle.

13. A balanced armature receiver comprising:

a housing having a sound port;

a diaphragm disposed in and separating the housing into a back volume and a front volume acoustically coupled to an exterior of the housing by the sound port, the diaphragm comprising a paddle having an area of concentrated mass located between at or near a central portion of the paddle, the area of concentrated mass having an area density greater than an area density of other portions of the paddle;

a motor disposed in the housing and comprising a coil magnetically coupled to an armature having an end portion movably disposed between magnets retained by a yoke, the armature coupled to the paddle, wherein the armature moves the paddle in response to an excitation signal applied to the coil, wherein the area of concentrated mass shifts a frequency response peak attributed predominately to the diaphragm to a lower frequency compared to a frequency response peak in the absence of the area of concentrated mass.

14. The balanced armature receiver of claim 13 further comprising a discrete element fastened to the paddle, wherein the discrete element contributes to the area of concentrated mass.

15. The balanced armature receiver of claim 14, wherein the paddle comprises a substantially planar member having a material thickness between 0.03 mm and 0.07 mm and an effective modulus not less than 30 Gigapascal.

16. The balanced armature receiver of claim 14 further comprising:

a frame disposed about a periphery of the paddle, the frame separated from the paddle by a gap; and a film covering the gap and any mass-reducing apertures in the paddle, wherein the film permits movement of the paddle relative to the frame.

17. The balanced armature receiver of claim 14, wherein the area of concentrated mass increases a sound pressure level (SPL) of a frequency response peak attributed predominately to the balanced armature receiver diaphragm compared to an SPL of the frequency response peak attributed predominately to the balanced armature receiver diaphragm in the absence of the area of concentrated mass.

18. The balanced armature receiver of claim 14, wherein the area of concentrated mass shifts the frequency response peak attributed predominately to the balanced armature receiver diaphragm by at least 10%.

19. The balanced armature receiver of claim 14, wherein the area of concentrated mass shifts the frequency response peak attributed predominately to the balanced armature receiver diaphragm by at least 15%.

* * * * *